(114.)
DANIEL M. LAMB.
Improvement in Plows.
No. 122,261.  Patented Dec. 26, 1871.
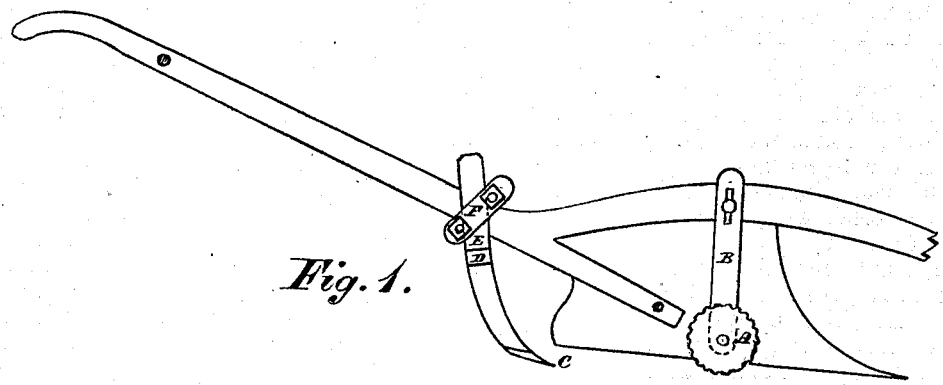
Fig. 1.
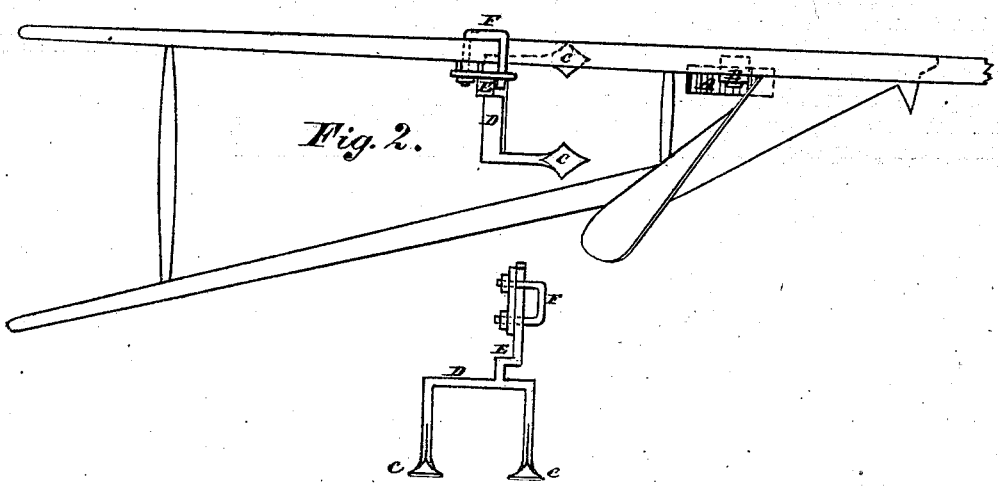
Fig. 2.
Fig. 3.
Witnesses.  Inventor.

UNITED STATES PATENT OFFICE.

DANIEL MARTIN LAMB, OF STRATHROY, CANADA, ASSIGNOR TO HIMSELF AND VAN RANSSELAER WARREN, OF SOMERVILLE, MASSACHUSETTS.

IMPROVEMENT IN PLOWS.

Specification forming part of Letters Patent No. 122,261, dated December 26, 1871.

Specification describing an Improvement in Plows and Subsoil Attachment combined, invented by DANIEL MARTIN LAMB, of the town of Strathroy, in the county of Middlesex, in the Province of Ontario and Dominion of Canada.

My invention relates to the combination with a common plow of a subsoil attachment and anti-friction wheel, the object being to plow and pulverize the land below the furrow at one operation; to facilitate surface drainage, and for enrichment of the roots of cereals.

Figure 1 is a side elevation of a plow, having the mold-board removed to show my subsoil attachment and anti-friction wheel. Fig. 2 is a top view of a plow embodying the same. Fig. 3 is a front elevation of my subsoil attachment detached from a plow.

A is the anti-friction wheel, attached by an arm, B, to the plow-beam between the mold-board and land-side. It travels on the bottom of the furrow to lighten the draft of the plow and steady its motion. The periphery of this wheel is serrated to form transverse flanges to insure its revolution, and it is adjusted so that its periphery shall be a suitable distance below the sole of the plow to prevent friction of the sole with the bottom of the furrow. By constructing this wheel with a corrugated periphery I adapt it to impart a vertical oscillating movement to the plow, which greatly lessens the draft and increases the effect of the subsoil attachment. The subsoil attachment operates in the furrow between the mold-board and land-side. It is attached to the handle connecting with the latter in such a manner as pulverize and loosen the earth below the furrow, to nourish the roots of cereals, and to render the land more absorbent. This subsoil attachment or device consists of two or more cultivator-teeth, C C, connected to a bar, D, at a suitable distance apart, to which bar is attached a crank-arm, E, secured by a clamp, F, to the plow-handle, and so adjusted that the teeth C shall extend below the sole of the plow to the required depth they are intended to subsoil.

By means of my invention the land can be plowed and subsoiled at one operation.

I claim as my invention—

The combination of the corrugated bearing-wheel A and subsoil attachment C C D with a plow, in manner substantially as and for the purpose specified.

D. M. LAMB.

Witnesses:
CHAS. MORRISON,
R. C. SCATCHERD. (114)